July 17, 1923.  
A. L. LAUBY  
1,462,290  
TRACK RAIL JOINT AND SAFETY DEVICE  
Filed July 15, 1922
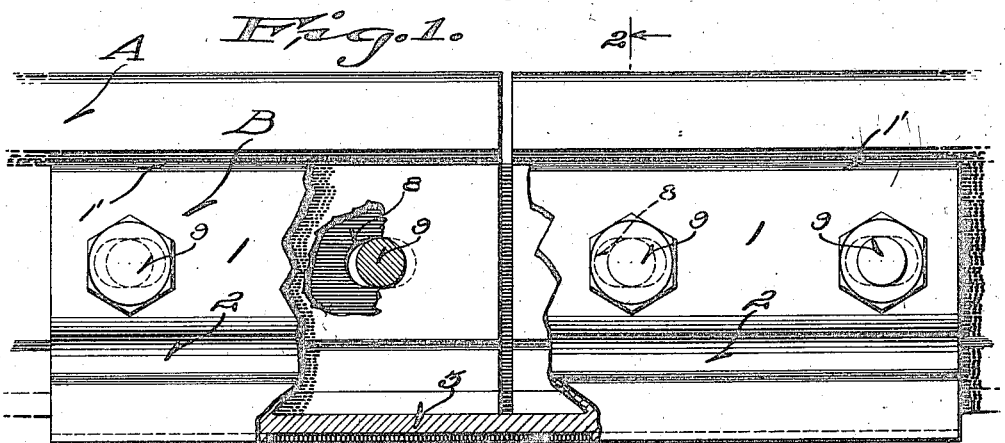
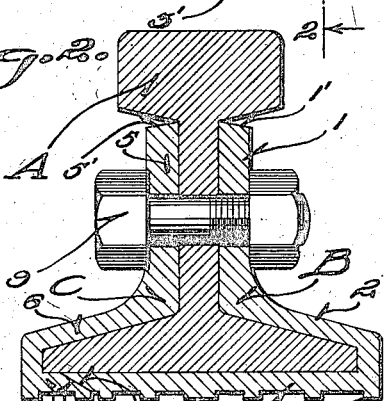
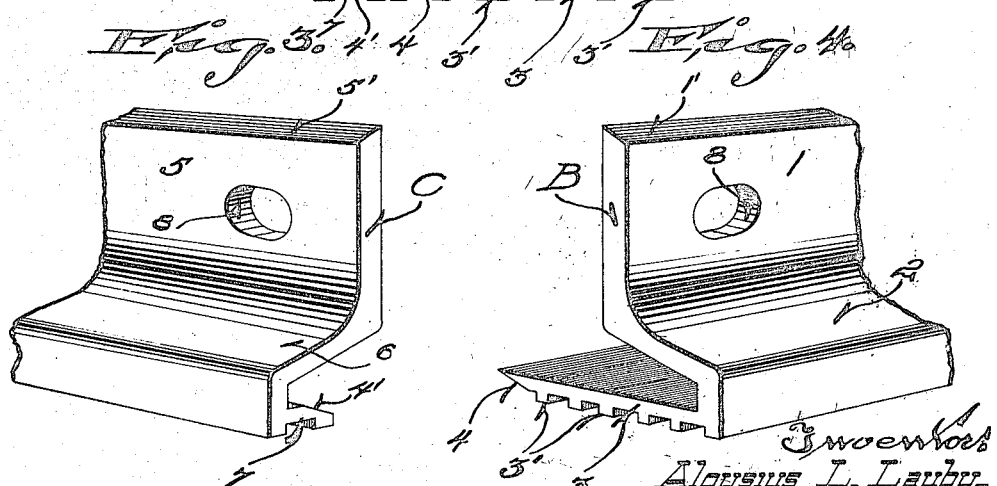
Witness:  
Erwin B. Eiring
Inventor:  
Aloysius L. Lauby  
By (signature)  
Attorneys Patented July 17, 1923.

1,462,290

UNITED STATES PATENT OFFICE.

ALOYSIUS L. LAUBY, OF ANTIGO, WISCONSIN.

TRACK-RAIL JOINT AND SAFETY DEVICE.

Application filed July 15, 1922. Serial No. 575,152.

*To all whom it may concern:*

Be it known that I, ALOYSIUS L. LAUBY, a citizen of the United States, and resident of Antigo, in the county of Langlade and State of Wisconsin, have invented certain new and useful Improvements in Track-Rail Joints and Safety Devices; and I do hereby declare that the following is a full, clear, and exact description thereof.

My invention refers to fish plate units for rail joints, and it has for its primary object to provide peculiarly constructed fish plate units, which will grip the both sides of the rail at the joint, and which fish plate units will form a metallic support for the joint between ties, whereby the joint is firmly supported and braced against load strain and whereby said joint is rigidly secured to overcome vibration and also to prevent the detrimental result of breakage or chipping of the rail at the joint under low temperature weather conditions.

Another feature of the peculiarly constructed rail joint fish plate is, that one of the units may be utilized at any point throughout the length of the rail to prevent spreading, where maximum strain will occur around curves, or the like, and a further advantage of the invention is that, although the meeting ends of the rail are securely held against both lateral and vertical movement, the said joints permit free longitudinal movement of the rails to compensate for expansion and contraction.

Furthermore, owing to the peculiar construction of my rail joint, trains passing over rails equipped with my improved construction of fish plate, will not develop the noisy clatter usually noticed on ordinarily constructed railroads, and breakage of the rails at the joint is reduced to a minimum, it being understood that the load strain at the joint is divided between two ties and solidly supported by the fish plate which snugly nests under the rail web. The fish plates obviously may be made of any desirable metal, either cast or rolled, and they may be of various sizes to meet special design of rails, and they are usually manufactured for standard railroad construction without machine work.

Another object of my invention is to provide the fish plate units with a tapered joint, whereby they are firmly locked together when coupled to the meeting ends of rails, and the draw of the bolts passing thru the fish plate units and rail, will act as a wedging force to contract the encased rail ends to form a practical jointless connection between said rail ends.

With the above objects in view, the invention consists in certain peculiarities of construction and combination of parts, as are hereinafter set forth with reference to the accompanying drawings and subsequently claimed.

In the drawings,

Figure 1 represents a side elevation, partly in section, of a rail joint equipped with fish plate units embodying the features of my invention.

Figure 2, a cross section of the same.

Figure 3, a fragmentary perspective view of one of the fish plate units, and

Figure 4, a fragmentary perspective view of the companion fish plate unit.

Referring by characters to the drawings, A represents a standard rail having an upper rail head and lower rail web. To the outer side of such rail is fitted a fish plate unit B, conforming generally to the contour of the rail. This unit comprises a web strip 1, an upper flange strip 2, and a lower flange strip 3. The web strip is nested solidly against the web of the rail, and the upper flange strip 2 engages the upper face of the rail base and the lower flange strip engages the bottom face of the rail, and said lower flange strip extends across the bottom surface of the rail base a greater part of its width and terminates with a beveled face 4. The lower surface of the flange strip 3 is provided with a plurality of longitudinal webs 3'.

The inner fish-plate unit C is formed with a vertical web strip 5 and an upper flange strip 6, together with a lower lip 7, which lip constitutes a continuation of the lower flange strip 3 of the outer fish-plate member. The lip is provided with a beveled face 4' at its edge, which face is in conjunction with a corresponding beveled face 4 of the lower flange strip 3, to form a lip joint with the lip as the male member of the joint. The upper edges 5'—1' of the inner and outer fish-plate webs 5 and 1, respectively, are downwardly beveled to form water sheds in conjunction with the corners of the rail tread and its central web portion, whereby moisture is deflected from entering between the web strips and the rail-web, which would otherwise tend to develop rust at its joint.

Both of the web strips 5—1 are formed with a plurality of longitudinally directed slots 8, which slots are adapted to receive standard stay-bolts 9, which, together with their nuts, serve to firmly bind the fish-plate units and the ends of the abutting rails together, as best shown in Figure 1 of the drawings. By providing these elongated slots it is obvious that there is sufficient play of the bolts back and forth, which are carried by the rail-webs, whereby contraction and expansion is compensated for and the ends of the rails can thus shift slightly back and forth upon the fish-plate units, which units are held firmly against end play by ordinary spikes which bind them to the ties.

From the foregoing description, with particular reference to Figure 1 of the drawings, it will be seen that the abutting ends of the rails, which are joined together by the fish plate units, are supported against load strain by the lower flange strips 3 and they are also supported against upward movement or vibration by the upper flange strips 2 and 6, respectively, of the fish-plates. Hence there can be no vertical play of the ends of the rails, even though they are unsupported between the ties except by the lower flange strip 3.

It will also be observed that when the fish-plate units are firmly clamped about the ends of the abutting rails, the bolts, when drawn tightly, will serve also to impart an upward draw to the lip 7 of the inner fish-plate, which upward draw tends to support the bottom of the rail and more firmly grip it, due to the contact between the inner surface of the lower flange strip 3 with the bottom surface of the rail flange. In other words, the bevel faces 4 and 4' of the fish-plates form an interlocking joint for reinforcing the metallic bottom support of the rail ends.

In instances where there develops a tendency of the rails to spread at certain points of the road, it is within the scope of my invention to utilize the outer fish-plate unit B as an anti-rail spreading device. When so utilized, the outer fish-plate B is not bolted to the web of the rail, but is simply nested about it, as shown in Figure 1 of the drawing, and thereafter this fish-plate unit is spiked to the tie or ties at the point where the tendency to spread may develop. The fish-plate unit, in this case, will serve as a metallic reinforcing stay for the rail to prevent spreading.

It is to be particularly noted that the upper surface 1' of the fish plate is outwardly and downwardly beveled and that the upper inner edge of such plate is in substantial contact with the under surface of the rail head, as may be seen from Figure 2 of the drawing. This construction prevents water from getting between the fish plate and rail. When water falls upon the rail head it follows the sides of the rail head downwardly and follows along the sloping under side of such rail head in the form of drops. These drops contact with the beveled surface 1' of the fish plate 1 and are carried outwardly and downwardly before they come in contact with the inner uppermost edge of such fish plate. It is apparent that if water contacts with two surfaces clamped into intimate contact with each other that capillary action will draw the water into the space between these surfaces. This, however, is avoided by the peculiar construction shown, as the underhanging drop from the rail head contacts with the beveled upper face 1' of the fish plate before it arrives at the clamped surfaces between the fish plate and the rail. Therefore, this construction insures a dry and non-rusting joint.

It is also to be noted that the ribs upon the under side of the lower flanges of the fish plate have flat bottoms and extend longitudinally. These flat bottoms prevent cutting of the fibre of the tie and merely form depressions or compressed channels in such tie transversely of the fibres. In this manner a very secure locking engagement is attained between the bottom ribbed surface of the fish plate and the cross tie, such as would not be secured if the fibres had been cut. If the fibres had been cut they would easily be sheared off by any tendency to transverse motion of the fish plate. By maintaining the continuity of the fibres, due to the flat bottom formation of the longitudinal ribs, this tendency towards weakness, due to the shearing action, is avoided, and a very secure union or grip between the bottom flanges and cross tie is secured.

While I have shown and described a simple exemplification of my invention minutely as to details, it is understood that I may vary the structural features of it within the scope of the claims.

I claim:—

A rail joint unit comprising a metallic fish plate for nested engagement with a rail comprising two component parts each being shaped in cross section to conform to the rail and having a vertical web-strip having an outwardly and downwardly sloping beveled upper face with its uppermost inner edge in close proximity to the under surface of the rail head, said web-strip having upper and lower flange strips, the lower flange strips of said component parts cooperating to engage the bottom of the rail-base throughout substantially the entire width of said rail-base, said lower flange strips having a series of flat bottom longitudinal ribs.

In testimony that I claim the foregoing I have hereunto set my hand at Antigo, in the county of Langlade and State of Wisconsin.

ALOYSIUS L. LAUBY.